US012620528B2

(12) United States Patent
Utsumi et al.

(10) Patent No.: US 12,620,528 B2
(45) Date of Patent: May 5, 2026

(54) CONDUCTOR COMPOSITION FOR ELECTRODE FORMATION

(71) Applicant: KYOCERA Corporation, Kyoto (JP)

(72) Inventors: Nihiro Utsumi, Kirishima (JP); Tetsuya Kimura, Aira (JP); Yusuke Azuma, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 18/580,473

(22) PCT Filed: Jul. 12, 2022

(86) PCT No.: PCT/JP2022/027455
§ 371 (c)(1),
(2) Date: Jan. 18, 2024

(87) PCT Pub. No.: WO2023/002889
PCT Pub. Date: Jan. 26, 2023

(65) Prior Publication Data
US 2025/0079079 A1 Mar. 6, 2025

(30) Foreign Application Priority Data
Jul. 20, 2021 (JP) ................................. 2021-119919

(51) Int. Cl.
*H01G 4/008* (2006.01)
*H01B 1/20* (2006.01)

(52) U.S. Cl.
CPC ............. *H01G 4/0085* (2013.01); *H01B 1/20* (2013.01)

(58) Field of Classification Search
CPC . H01B 1/00; H01B 1/20; H01G 4/008; H01G 4/30
See application file for complete search history.

(56) References Cited

U.S. PATENT DOCUMENTS 4,325,763 A 4/1982 Utsumi et al.
7,723,535 B2 * 5/2010 Zhang ..................... C23C 16/34 438/785
7,751,174 B2 * 7/2010 Kimura ................ H01G 4/2325 361/308.1

FOREIGN PATENT DOCUMENTS

CN 110734292 A * 1/2020
CN 114249296 A * 3/2022 ............. B82Y 40/00
EP 0694934 A2 * 1/1996 ......... C04B 41/5105
JP 54-140959 A 11/1979
JP 9-266129 A 10/1997
JP 2005079504 A * 3/2005
JP 2005-93577 A 4/2005

OTHER PUBLICATIONS

Shen et al "Electrically Conductive Silver Paste Obtained by Use of Silver Neodecanoate as Precursor", Journal of Electronic Materials, vol. 44, No. 2, 2015.*
Choi et al "Highly conductive polymer-decorated Cu electrode films printed on glass substrates with novel precursor-based inks and pastes", J. Mater. Chem., 2012, 22, 3624.*
JP 2005079504A (pub Mar. 2005) English language machine translation.*
JP 2004158732A (pub Jun. 2004) English language machine translation.*
JP 4439968B2 (pub Mar. 2010) English language machine translation.*
English language machine translation of EP0694934 (pub date Jan. 1996).*
Yonezawa et al "The preparation of copper fine particle paste and its application as the inner electrode material of a multilayered ceramic capacitor", Nanotechnology 19 (2008) 145706 (5pp).*

* cited by examiner

*Primary Examiner* — Mark Kopec
(74) *Attorney, Agent, or Firm* — Volpe Koenig

(57) ABSTRACT

A conductive composition for electrode formation contains an organometallic compound containing a metal element, and an organic solvent. The conductive composition is substantially free of metal particles.

4 Claims, No Drawings

CONDUCTOR COMPOSITION FOR ELECTRODE FORMATION

TECHNICAL FIELD

The present disclosure relates to a conductive composition for forming electrodes for multilayer capacitors.

BACKGROUND OF INVENTION

A known technique is described in, for example, Patent Literature 1.

CITATION LIST

Patent Literature

Patent Literature 1: Japanese Unexamined Patent Application Publication No. 2005-93577

SUMMARY

In an aspect of the present disclosure, a conductive composition for electrode formation contains an organometallic compound containing a metal element, and an organic solvent. The conductive composition is substantially free of metal particles.

DESCRIPTION OF EMBODIMENTS

The objects, features, and advantages of the present disclosure will become more apparent from the following detailed description and the drawings.

A multilayer ceramic capacitor mainly includes a capacitor body and a pair of external electrodes outside the capacitor body. The capacitor body includes multiple dielectric layers and multiple internal electrodes alternately stacked on one another. One of the external electrodes is connected to a group of odd-numbered internal electrodes. The other external electrode is connected to a group of even-numbered internal electrodes.

Example conductive pastes for forming electrodes for such a multilayer ceramic capacitor include a conductive paste containing an organometallic resinate, a metal powder that is a conductive filler, and an organic solvent described in Patent Literature 1.

The recent trend toward miniaturization of electronic devices such as smartphones facilitates miniaturization of multilayer ceramic capacitors, causing each layer to be thinner. For the internal electrodes made of Ni or Cu, the inventors have noticed that internal electrodes made of a metal powder described in Patent Literature 1 contain coarse particles or aggregates in the metal powder, which break through dielectric layers during stacking or pressing and cause the internal electrodes above and below the dielectric layers to come in contact with each other, thus causing short-circuiting.

Coarse particles in the metal powder are removed by classification or filtration for mass production. With classification, the classification accuracy may not be sufficiently high. The loss may also be large. With filtration, a known conductive paste, such as the conductive paste described in Patent Literature 1, which is highly viscous, takes a long time to pass through a filter.

In response to the above, smaller multilayer ceramic capacitors with less short-circuiting during firing are awaited, and conductive compositions for electrode formation for manufacturing such capacitors are awaited.

A conductive composition for electrode formation according to one or more embodiments of the present disclosure will now be described in detail. The conductive composition for electrode formation according to one or more embodiments of the present disclosure is not limited to the specific embodiments described below. The conductive composition for electrode formation according to one or more embodiments of the present disclosure may be embodied in various forms without departing from the spirit or the scope of the general idea defined by the appended claims.

Organometallic Compound

In one or more embodiments of the present disclosure, an organometallic compound contains a metal element. The organometallic compound may contain a base metal element, such as nickel, copper, cobalt, iron, tin, or zinc. The base metal element may specifically be nickel.

Examples of the organometallic compound containing a metal element include compounds expressed by Formulas 1 to 6 below.

Me-X—R (1)

(In the formula, Me is any metal, X is —S—, —O(CO)—, or —$SO_3$—, and R is a hydrocarbon group having 1 to 15 carbon atoms and a linear or cyclic main chain.)

R'—X'-Me-X—R (2)

(In the formula, Me is any metal, X and X' are each —S—, —O(CO)—, or —$SO_3$—, and R and R' are each a hydrocarbon group having 1 to 15 carbon atoms and a linear or cyclic main chain.)

R—X-Me-X—R (3)

(In the formula, Me is any metal, X is —S—, —O(CO)—, or —$SO_3$—, and R is a hydrocarbon group having 1 to 15 carbon atoms and a linear or cyclic main chain.)

(4)

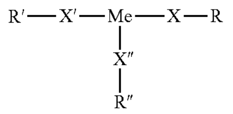

(In the formula, Me is any metal, X, X', and X" are each —S—, —O(CO)—, or —$SO_3$—, and R, R', and R" are each a hydrocarbon group having 1 to 15 carbon atoms and a linear or cyclic main chain.)

(5)

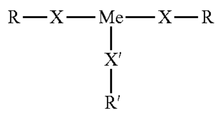

(In the formula, Me is any metal, X and X' are each —S—, —O(CO)—, or —$SO_3$—, and R and R' are each a hydrocarbon group having 1 to 15 carbon atoms and a linear or cyclic main chain.)

(6)

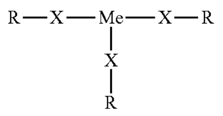

(In the formula, Me is any metal, X is —S—, —O(CO)—, or —$SO_3$—, and R is a hydrocarbon group having 1 to 15 carbon atoms and a linear or cyclic main chain.)

The organometallic compounds containing a metal element expressed by Formulas 1 to 6 may be a compound of a carboxylic acid and a metal, or specifically, a carboxylic acid and nickel, a carboxylic acid and copper, a carboxylic acid and cobalt, a carboxylic acid and iron, a carboxylic acid and tin, or a carboxylic acid and zinc.

Specific examples of the compound include nickel octoate (nickel(II) bis(2-ethylhexanoate)), copper octoate (copper (II) bis(2-ethylhexanoate)), cobalt octoate (cobalt(II) bis(2-ethylhexanoate)), iron octoate (iron(III) tris(2-ethylhexanoate)), tin octoate (tin(II) bis(2-ethylhexanoate)), zinc octoate (zinc bis(2-ethylhexanoate)), nickel naphthenate, copper naphthenate, cobalt naphthenate, iron naphthenate, zinc naphthenate, nickel acetate, copper acetate, cobalt acetate, tin acetate, zinc acetate, nickel oxalate, iron oxalate, copper oxalate, cobalt oxalate, tin oxalate, and zinc oxalate. The compound may be nickel octoate (nickel(II) bis(2-ethylhexanoate)), nickel naphthenate, nickel acetate, or nickel oxalate.

The conductive composition for electrode formation (described later) contains at least one organometallic compound containing a metal element described above. The conductive composition may contain two or more organometallic compounds of the same metal and different organic compounds or two or more organometallic compounds of different metals.

Organic Solvent

In one or more embodiments of the present disclosure, an organic solvent may be any organic solvent that dissolves the organometallic compound containing a metal element described above and controls and improves coating work. Examples of the organic solvent include terpineols, such as α-terpineol, cyclohexanone, diethylene glycol monobutyl ether acetate, and dihydroterpineol acetate. The organic solvent may be dihydroterpineol acetate.

The conductive composition for electrode formation (described later) may contain at least one of the organic solvents described above, or may contain two or more of the organic solvents described above. For example, the organic solvent for dissolving the organometallic compound may be different from the main solvent in the conductive composition for electrode formation.

Conductive Composition for Electrode Formation

In one or more embodiments of the present disclosure, the conductive composition for electrode formation contains at least one of the organometallic compounds described above and at least one of the organic solvents described above, and is substantially free of metal particles.

Being substantially free of metal particles refers to the conductive composition for electrode formation observed using a scanning electron microscope (a magnification of 50000×, a field of view of 2.5×1.8 μm, and 100 fields of view) with the resulting image including no metal particles each with a particle size greater than or equal to 20 nm. The particle size analysis is performed by, for example, marking or using image analysis software (ImageJ).

The content of the organometallic compound in the conductive composition for electrode formation may be 0.5 to 80 mass % inclusive, or specifically, 20 to 50 mass % inclusive, of the entire composition.

The content of the organic solvent in the conductive composition for electrode formation may be 10 to 90 mass % inclusive, or specifically, 30 to 70 mass % inclusive, of the entire composition.

The conductive composition for electrode formation may have a viscosity of less than or equal to 50000 mPa·s, or specifically, 1000 to 30000 mPa·s inclusive. The viscosity is measured at 25° C. and a rotational speed of 20 rpm using a Brookfield viscometer.

The conductive composition for electrode formation is formed by dissolving the organometallic compound in the organic solvent.

The conductive composition for electrode formation is used to form electrode layers for multilayer ceramic capacitors. The conductive composition for electrode formation is substantially free of metal particles, and the metal contained in the organometallic compound is used to form the electrode layers. During manufacture of multilayer ceramic capacitors, no metal particles break through dielectric layers during stacking or pressing. The multilayer capacitors can thus be miniaturized with less short-circuiting during firing.

In one or more embodiments of the present disclosure, the conductive composition for electrode formation may further contain a dielectric material in addition to the organometallic compound and the organic solvent.

Dielectric Material

The dielectric material may be, for example, a material used for dielectric layers in multilayer ceramic capacitors. A multilayer ceramic capacitor is obtained by debinding a stack of layers of unfired dielectric tape and layers of electrode patterns of the conductive composition for electrode formation alternately stacked on one another and then firing the debound stack. The dielectric tape and the electrode patterns shrink at different shrinkage rates during firing. A larger difference in the shrinkage rate may cause, for example, breaks and delamination in the multilayer ceramic capacitor, thus decreasing the yield. The conductive composition for electrode formation preliminarily containing a dielectric material used for the dielectric layers reduces the difference in the shrinkage rate between the dielectric tape and the electrode patterns, thus reducing the decrease in the yield.

The dielectric material is to reduce the difference in the shrinkage rate between the dielectric tape and the electrode patterns. Thus, various known materials for dielectric layers may be used. Examples of the dielectric material include a strontium titanate powder, a barium titanate powder, a barium strontium titanate powder, a $Ba_{1-x}Ca_xTiO_3$ (x=0.01 to 0.1) or $Ba_{1-x}Sr_xTiO_3$ (X=0.01 to 0.1) powder, which contains a dissolved alkaline earth element, such as calcium or strontium, in the barium site of barium titanate, and a $Ba_{1-x}Ca_xTi_{1-y}ZryO_3$ (x=0.01 to 0.1, y=0.05 to 0.5) powder, which contains dissolved calcium in the barium site of barium titanate and dissolved zirconium in the titanium site. The dielectric material may be the same as the dielectric material (common material) used for the dielectric layers in the multilayer ceramic capacitors to be manufactured using the conductive composition for electrode formation. When the dielectric material used for the dielectric layers is, for example, barium titanate, the dielectric material contained in the conductive composition for electrode formation may also be a barium titanate powder.

The dielectric material has a particle size of, for example, less than or equal to 50 nm. The particle size is measured by observing the particles using a scanning electron microscope and calculating the arithmetic mean of the longest width of the particles in a certain image (a magnification of 50000×, a field of view of 2.5×1.8 μm, and 100 fields of view). The particle size can be determined by, for example, marking or using image analysis software.

The content of the dielectric material in the conductive composition for electrode formation may be 0.5 to 40 mass % inclusive, or specifically, 5 to 20 mass % inclusive, of the amount of metal in the organometallic compound.

The conductive composition for electrode formation containing the dielectric material is formed by dissolving the organometallic compound in the organic solvent and adding the dielectric material.

In one or more embodiments of the present disclosure, the conductive composition for electrode formation may further contain a binder in addition to the organometallic compound and the organic solvent.

Binder

The conductive composition for electrode formation containing a binder has adjustable viscosity. The conductive composition for electrode formation appropriate for a printing method can be used to print the conductive composition on green sheets.

The binder may thermally decompose at a low oxygen concentration. Examples of the binder include celluloses, such as ethyl cellulose and nitrocellulose, an acrylic resin, a phenolic resin, an alkyd resin, a styrene resin, rosin ester, and polyvinyl butyral. The binder may be ethyl cellulose or polyvinyl butyral.

One such binder may be used alone, or a mixture of two or more different binders may be used.

The content of the binder in the conductive composition for electrode formation may be greater than or equal to 0.1 mass % and less than or equal to 10 mass % of the entire composition. For the binder being ethyl cellulose, the content may be greater than or equal to 2.5 mass % and less than or equal to 7 mass %. For the binder being polyvinyl butyral, the content may be greater than or equal to 0.5 mass % and less than or equal to 5 mass %.

The conductive composition for electrode formation containing the binder is formed by dissolving the organometallic compound in the organic solvent and adding the binder.

In one or more embodiments of the present disclosure, the conductive composition for electrode formation may contain the dielectric material and the binder in addition to the organometallic compound and the organic solvent.

The conductive composition for electrode formation containing the dielectric material and the binder is formed by dissolving the organometallic compound in the organic solvent and adding the dielectric material and the binder.

The conductive composition for electrode formation, the conductive composition for electrode formation containing the dielectric material, the conductive composition for electrode formation containing the binder, or the conductive composition for electrode formation containing the dielectric material and the binder described above may additionally contain, for example, a plasticizer, a dispersant, a viscosity modifier, an oxidizing agent, and inorganic oxide unless such addition does not affect the effects of the conductive composition.

Method for Manufacturing Multilayer Ceramic Capacitors

In one or more embodiments of the present disclosure, the conductive composition for electrode formation can be used to manufacture multilayer ceramic capacitors. To manufacture a multilayer ceramic capacitor, for example, a raw material powder mainly containing $BaTiO_3$ and a dispersant are mixed in a solvent to obtain slurry. The slurry is used to form green sheets using, for example, a die coater or a gravure coater. The conductive composition for electrode formation is printed on the surface of each green sheet to obtain a green sheet with a metal composition. The green sheets with the metal composition are stacked, and then debound and fired to obtain a stack. A metal paste is coated on the stack by, for example, dipping or printing and transferring and then thermally treated to form external electrodes.

Examples of the printing method for printing the conductive composition for electrode formation on the surface of each green sheet include screen printing, gravure printing, and inkjet printing.

For the conductive composition for electrode formation with high viscosity, screen printing and gravure printing may be used. For the conductive composition for electrode formation with low viscosity, inkjet printing may be used.

The multilayer ceramic capacitor manufactured in this manner includes internal electrodes each having a flat surface to reduce factors of an electric field concentrating at protrusions in the internal electrodes causing electric breakdown of dielectric layers. The multilayer ceramic capacitor can thus stably provide insulation and voltage resistance.

The present disclosure may be implemented in the following forms.

In one or more embodiments of the present disclosure, a conductive composition for electrode formation contains an organometallic compound containing a metal element, and an organic solvent. The conductive composition is substantially free of metal particles.

In one or more embodiments of the present disclosure, the conductive composition for electrode formation reduces short-circuiting during firing, thus allowing miniaturization of multilayer capacitors.

The invention claimed is:

1. A conductive composition for electrode formation, the conductive composition consisting only of:

an organometallic compound containing at least one base metal element;

an organic solvent; and a dielectric material.

2. The conductive composition according to claim 1, wherein the conductive composition includes two or more organometallic compounds, each containing a base metal element.

3. A conductive composition for electrode formation, the conductive composition consisting only of:

an organometallic compound containing at least one base metal element;

an organic solvent;

a dielectric material; and a binder.

4. The conductive composition according to claim 3, wherein the conductive composition includes two or more organometallic compounds, each containing a base metal element.

* * * * *